US006504864B1

(12) United States Patent
Dupuis et al.

(10) Patent No.: US 6,504,864 B1
(45) Date of Patent: *Jan. 7, 2003

(54) DIGITAL ACCESS ARRANGEMENT CIRCUITRY AND METHOD FOR CONNECTING TO PHONE LINES HAVING A SECOND ORDER DC HOLDING CIRCUIT

(75) Inventors: Timothy J. Dupuis, Austin, TX (US); George Tyson Tuttle, Austin, TX (US); Jeffrey W. Scott, Austin, TX (US); Navdeep S. Sooch, Austin, TX (US); David R. Welland, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/098,488

(22) Filed: Jun. 16, 1998

Related U.S. Application Data

(63) Continuation-in-part of application No. 09/035,779, filed on Mar. 4, 1998, now Pat. No. 6,389,134, and a continuation-in-part of application No. 09/035,175, filed on Mar. 4, 1998, now Pat. No. 6,385,235, and a continuation-in-part of application No. 09/034,687, filed on Mar. 4, 1998, now Pat. No. 6,359,983, and a continuation-in-part of application No. 09/034,683, filed on Mar. 4, 1998, now Pat. No. 6,167,134, and a continuation-in-part of application No. 09/034,682, filed on Mar. 4, 1998, now Pat. No. 6,408,034, and a continuation-in-part of application No. 09/034,620, filed on Mar. 4, 1998, now Pat. No. 6,160,885, and a continuation-in-part of application No. 09/034,456, filed on Mar. 4, 1998, now Pat. No. 6,144,326, and a continuation-in-part of application No. 09/034,455, filed on Mar. 4, 1998, and a continuation-in-part of application No. 08/837,714, filed on Apr. 22, 1997, now Pat. No. 6,430,229, and a continuation-in-part of application No. 08/837,702, filed on Apr. 22, 1997, now Pat. No. 5,870,046, and a continuation-in-part of application No. 08/841,409, filed on Apr. 22, 1997, now Pat. No. 6,137,827.

(51) Int. Cl.[7] ................................................ H04B 3/00
(52) U.S. Cl. .................. 375/220; 379/395.01; 379/412; 375/285
(58) Field of Search ................................. 375/257, 259, 375/285, 295, 296, 316, 340, 346, 354, 371, 220; 379/90.01, 393–399.01, 412

(56) References Cited

U.S. PATENT DOCUMENTS

| | | |
|---|---|---|
| 3,750,024 A | 7/1973 | Dunn et al. |
| 3,904,833 A | 9/1975 | Beene et al. |
| 3,981,006 A | 9/1976 | Takayama et al. |
| 4,054,941 A | 10/1977 | Shichman |
| 4,066,843 A | 1/1978 | Waks et al. |
| 4,118,603 A | 10/1978 | Kumhyr |
| 4,216,426 A | 8/1980 | Flora ........................... 455/28 |
| 4,271,526 A | 6/1981 | Flora |
| 4,349,821 A | 9/1982 | Vancsa |
| 4,384,274 A | 5/1983 | Mao |

(List continued on next page.)

OTHER PUBLICATIONS

Burr–Brown Application Bulletin, "Boost ISO120 Bandwidth to More than 100kHz," pp. 1–3 (Sep. 1990).

(List continued on next page.)

Primary Examiner—Amanda T. Le
(74) Attorney, Agent, or Firm—O'Keefe, Egan & Peterman, LLP

(57) ABSTRACT

A digital direct access arrangement (DAA) circuitry may be used to terminate the telephone connections at the user's end that provides a communication path for signals to and from the phone lines. Briefly described, the DAA provides a programmable means for the DC termination for a variety of international phone standards. The invention may also be utilized with means for transmitting and receiving a signal across a capacitive isolation barrier. More particularly, a DC holding circuit is provided that is a second order circuit. The use of a second order circuit provides improved distortion characteristics, particularly at low frequencies.

29 Claims, 8 Drawing Sheets

U.S. PATENT DOCUMENTS

| | | |
|---|---|---|
| 4,393,516 A | 7/1983 | Itani |
| 4,415,777 A | 11/1983 | Agnew |
| 4,475,208 A | 10/1984 | Ricketts |
| 4,528,664 A | 7/1985 | Cheng et al. |
| 4,541,104 A | 9/1985 | Hirosaki |
| 4,594,577 A | 6/1986 | Mao |
| 4,607,170 A | 8/1986 | Wickman |
| 4,656,661 A | 4/1987 | Carbrey |
| 4,686,697 A | 8/1987 | Shapiro et al. |
| 4,686,699 A | 8/1987 | Wilkie |
| 4,712,233 A | 12/1987 | Kuo |
| 4,720,811 A | 1/1988 | Yamaguchi et al. |
| 4,757,528 A * | 7/1988 | Falater et al. ............... 379/412 |
| 4,901,217 A | 2/1990 | Wilson |
| 4,943,807 A | 7/1990 | Early et al. |
| 4,996,529 A | 2/1991 | Connell |
| 5,020,102 A * | 5/1991 | Schorr .................... 379/399.01 |
| 5,021,950 A | 6/1991 | Nishikawa |
| 5,032,819 A | 7/1991 | Sakuragi et al. |
| 5,051,799 A | 9/1991 | Paul et al. |
| 5,068,659 A | 11/1991 | Sakaguchi .................. 341/143 |
| 5,086,454 A | 2/1992 | Hirzel |
| 5,224,154 A | 6/1993 | Aldridge et al. |
| 5,237,511 A | 8/1993 | Caird et al. |
| 5,258,721 A | 11/1993 | Zanders |
| 5,260,941 A | 11/1993 | Wilder et al. |
| 5,262,779 A | 11/1993 | Sauer |
| 5,311,588 A | 5/1994 | Polcyn et al. |
| 5,323,451 A | 6/1994 | Yatsunami |
| 5,333,196 A | 7/1994 | Jakab |
| 5,337,338 A | 8/1994 | Sutton et al. .................. 377/33 |
| 5,343,514 A | 8/1994 | Snyder |
| 5,343,516 A | 8/1994 | Callele et al. |
| 5,355,407 A | 10/1994 | Lazik |
| 5,355,468 A | 10/1994 | Jeppesen, III et al. |
| 5,361,067 A | 11/1994 | Pinckley |
| 5,361,296 A | 11/1994 | Reyes et al. |
| 5,375,051 A | 12/1994 | Decker et al. |
| 5,377,260 A | 12/1994 | Long |
| 5,384,808 A | 1/1995 | Van Brunt et al. |
| 5,390,249 A | 2/1995 | Park |
| 5,406,283 A | 4/1995 | Leung |
| 5,426,698 A | 6/1995 | Reymond |
| 5,438,678 A | 8/1995 | Smith |
| 5,442,694 A | 8/1995 | Chitrapu et al. |
| 5,459,721 A | 10/1995 | Yoshida |
| 5,465,298 A * | 11/1995 | Wilkison et al. ....... 379/406.02 |
| 5,467,385 A | 11/1995 | Reuben et al. |
| 5,473,552 A | 12/1995 | Chen et al. |
| 5,500,895 A | 3/1996 | Yurgelites .................... 379/412 |
| 5,506,900 A | 4/1996 | Fritz ......................... 379/402 |
| 5,506,903 A | 4/1996 | Yamashita |
| 5,509,068 A | 4/1996 | Bayless et al. |
| 5,511,118 A | 4/1996 | Gores et al. |
| 5,521,967 A | 5/1996 | Novas et al. |
| 5,533,053 A | 7/1996 | Hershbarger ................ 375/257 |
| 5,544,241 A | 8/1996 | Dibner et al. |
| 5,546,448 A | 8/1996 | Caswell et al. |
| 5,555,100 A | 9/1996 | Bloomfield et al. |
| 5,561,712 A | 10/1996 | Nishihara |
| 5,577,104 A | 11/1996 | Knuth et al. |
| 5,592,529 A | 1/1997 | Linsker |
| 5,598,157 A | 1/1997 | Kornblum et al. |
| 5,644,629 A | 7/1997 | Chow |
| 5,654,984 A | 8/1997 | Hershbarger et al. ....... 375/257 |
| 5,659,608 A | 8/1997 | Stiefel |
| 5,675,640 A | 10/1997 | Tappert et al. |
| 5,694,465 A | 12/1997 | Apfel |
| 5,705,978 A | 1/1998 | Frick et al. |
| 5,721,774 A | 2/1998 | Stiefel |
| 5,737,411 A | 4/1998 | Apfel et al. |
| 5,740,214 A | 4/1998 | Koenig et al. |
| 5,745,060 A | 4/1998 | McCartney et al. |
| 5,751,803 A | 5/1998 | Shpater |
| 5,790,656 A | 8/1998 | Rahamim et al. ........... 379/399 |
| RE35,901 E * | 9/1998 | Wilkison et al. ....... 379/406.15 |
| 5,805,687 A | 9/1998 | Westergaard et al. |
| 5,818,923 A | 10/1998 | Consiglio et al. |
| 5,841,840 A | 11/1998 | Smith et al. |
| 5,848,133 A | 12/1998 | Kuwahara et al. |
| 5,859,584 A | 1/1999 | Counsell et al. |
| 5,870,046 A | 2/1999 | Scott et al. |
| 5,875,235 A | 2/1999 | Mohajeri |
| 5,881,102 A | 3/1999 | Samson |
| 5,881,129 A | 3/1999 | Chen et al. |
| 5,901,210 A | 5/1999 | Schley-May |
| 5,907,596 A | 5/1999 | Karnowski |
| 5,914,671 A | 6/1999 | Tuttle |
| 5,917,364 A | 6/1999 | Nakamura |
| 5,940,459 A | 8/1999 | Hsu et al. |
| 5,946,393 A | 8/1999 | Holcombe |
| 5,959,372 A | 9/1999 | Every |
| 5,982,317 A | 11/1999 | Madsen |
| 5,991,335 A | 11/1999 | Price |
| 6,005,923 A | 12/1999 | Lee |
| 6,061,051 A | 5/2000 | Chan et al. |
| 6,072,778 A | 6/2000 | Labedz et al. |
| 6,081,586 A | 6/2000 | Rahamin et al. |
| 6,088,446 A * | 7/2000 | Huang ........................ 379/412 |
| 6,091,806 A * | 7/2000 | Rasmus et al. .......... 379/93.29 |
| 6,111,939 A | 8/2000 | Brabanec |
| 6,128,373 A | 10/2000 | Mathé et al. |
| 6,188,764 B1 * | 2/2001 | Huang et al. ............... 379/412 |
| 6,201,865 B1 * | 3/2001 | Dupuis et al. ............... 379/393 |

OTHER PUBLICATIONS

Burr–Brown Application Bulletin, "Simple Output Filter Eliminates ISO AMP Output Ripple and Keep's Full Bandwidth," pp. 1–3 (Jan. 1991).

Burr–Brown Application Bulletin, "Very Low Cost Analog Isolation with Power," pp. 1–4 (Mar. 1991).

Burr–Brown Application Bulletin, "IC Building Blocks form Complete Isolated 4–20mA Current–Loop Systems," pp. 1–9 (Jun. 1992).

Burr–Brown Application Bulletin, "Single Supply 4–20mA Current Loop Receiver," pp. 1–2 (Jun. 1992).

Audio Codec '97 Component Spefication Rev. 1.03, pp. 1–50 (Sep. 15, 1996).

Crystal Semiconductor Corp., "A Family of AES–EBU Interface Devices," David Knapp et al., pgs. 8.

Rockwell International Digital Communications Division, RC144Aci and RC144ACL Modem Designer's Guide (Preliminary), Order No. 876, Rev. 1, Nov. 1994.

Crystal Semiconductor CS4303 (CDB4303) Datasheet "107db, D/A Converter for Digital Audio," pp. 2.3–2.29 (Aug. 1993).

Crystal Semiconductor CS326 (CDB5326), CS 5327 (CDB5327), CS5328 (CDB5328), CS5329 (CDB5329), Datasheet, "16 and 18–Bit, Stereo A/D Converters for Digital Audio," pp. 3.5–3.37 (Mar. 1992).

Crystal Semiconductor CDB5345 Datasheet, "Evaluation Board for CS5345," pp. 3.73–3.99 (Aug. 1993).

Crystal Semiconductor CS8411, CS 8412 Preliminary Product Information "Digital Audio Interface Receiver," pp. 6.35–6.67 (Nov. 1993).

Crystal Semiconductor (Division of Cirrus Logic) CS8401A, CS84102A Datasheet, "Digital Audio Interface Transmitter," pp. 6.3–6.33 (Nov. 1993).

Burr–Brown ISO122 Datasheet, "Precision Lowest Cost Isolation Amplifier," pp. 1–15 (Nov. 1993).

Burr–Brown Application Bulletin, "Single–Supply Operation of Isolation Amplifier," pp. 1–4 (Aug. 1991).

International Search Report (Dec. 21, 1998).

* cited by examiner

DIGITAL ACCESS ARRANGEMENT CIRCUITRY AND METHOD FOR CONNECTING TO PHONE LINES HAVING A SECOND ORDER DC HOLDING CIRCUIT

This application is a continuation-in-part application of U.S. Ser. No. 08/841,409, U.S. Pat. No. 6,137,827, Ser. No. 08/837,702, U.S. Pat. No. 5,870,046, and Ser. No. 08/837,714, U.S. Pat. No. 6,430,229, all filed on Apr. 22, 1997, and the following U.S. patent applications filed on Mar. 4, 1998: Ser. No. 09/034,687, U.S. Pat. No. 6,359,983, entitled "Digital Isolation System With Data Scrambling" by Andrew W. Krone et al; Ser. No. 09/034,456, U.S. Pat. No. 6,144,326, entitled "Digital Isolation With ADC Offset Calibration; by Andrew W. Krone et al.; Ser. No. 09/034,455, pending, entitled "Ring-Detect Interface Circuitry and Method for a Communication System" by Timothy J. Dupuis et al.; Ser. No. 09/035,779, U.S. Pat. No. 6,389,134, entitled "Call Progress Monitor Circuitry and Method for a Communication System" by Timothy J. Dupuis et al.; Ser. No. 09/034,683, U.S. Pat. No. 6,167,134, entitled "External Resistor and Method to Minimize Power Dissipation in DC Holding Circuitry for a Communication System" by Jeffrey W. Scott et al.; Ser. No. 09/034,620, U.S. Pat. No. 6,160,885, entitled "Caller ID Circuit Powered Through Hookswitch Devices" by Jeffrey W. Scott et al.; and Ser. No. 09/034,6824, U.S. Pat. No. 6,408,034, entitled "Framed Delta Sigma Data With Unlikely Delta Sigma Data Patterns" by Andrew W. Krone et al.; and Ser. No. 09/035,175, U.S. Pat. No. 6,385,235, entitled "Direct Digital Access Arrangement Circuitry and Method For Connecting To Phone Lines" by Jeffrey W. Scott, Navdeep S. Sooch and David R. Welland, all of which are expressly incorporated herein by reference.

TECHNICAL FIELD OF THE INVENTION

This invention relates to the field of digital access arrangement circuitry. More particularly, this invention relates to digital access arrangement circuitry for connecting to a variety of phone line standards. The digital access arrangement circuitry may further include isolation barrier utilizing a capacitor coupled isolation barrier.

BACKGROUND

Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines.

Generally, governmental regulations specify the telephone interface requirements and specifications for a variety of parameters including AC termination, DC termination, ringer impedance, ringer threshold, etc. For example, Federal Communications Commission (FCC) Part 68 governs the interface requirements for telephones in the United States. However, the interface requirements world wide are not standardized, and thus, in countries other than the United States the applicable standards may include the TBR21, NET4, JATE, and various country specific PUT specifications. Because the interface requirements are not standardized from country to country, often different DAA circuitry is required for use in each country in order to comply with the appropriate standard. The requirement for different DAA circuitry, however, limits the use of one phone line interface in a variety of countries. Thus, for example, a modem in a laptop computer configured for interfacing with a phone line in one country may not necessarily operate properly in another country. Further, the requirement for different DAA circuitry in various countries hinders the design of a single integrated cost effective DAA solution for use world wide.

As mentioned above, the telephone interface requirements generally include specifications for DC termination of the telephone line. For example, the DC impedance that the DAA circuitry presents to the telephone line (typically $\leq 300\Omega$) may be required by regulations to be less than the AC impedance that the DAA circuitry presents to the telephone line (typically $\approx 600\Omega$). Consequently, inductive behavior is required from the section of the DAA circuitry that sinks DC loop current, which is typically called the DC termination or DC holding circuitry. This inductive behavior of the DC holding circuitry should provide both high impedance and low distortion for voiceband signals. The DC termination specifications may also include limits for the maximum current and power dissipation. For example, the TBR-21 specification requires the DC holding circuit to limit DC current to less than 60 mA with a maximum power dissipation of approximately 2 watts.

Prior techniques for implementing DC holding circuitry have included bipolar transistor (e.g., PNP transistor) implementations. These prior techniques, however, have suffered from various disadvantages. For example, although bipolar transistor implementations typically present a desired high impedance (e.g.,$>>600\Omega$) to the telephone network for voiceband signals, such implementations are limited. In contrast, a CMOS design would be preferable because CMOS technology allows a high level of integration, for example with other phone line interface functions. CMOS implementations on CMOS integrated circuits, however, may face considerable problems in dissipating the power consumed by the DC holding circuitry. The design of a DC holding circuit for use with multiple standards may be further complicated in that the various international specifications may conflict with regards to off-hook settling times and pulse dialing templates (which may require fast settling time constants) and high speed interface designs. (such as for use in modems) which require very low frequency operation (i.e. approximately as low as 10 Hz). Furthermore, it is desirable to implement such DC holding circuits in a manner that does not cause excessive distortion at low and high frequencies.

It is also desirable that the DAA circuitry act as an isolation barrier since an electrical isolation barrier must exist in communication circuitry which connects directly to the standard two-wire public switched telephone network and that is powered through a standard residential wall outlet. Specifically, in order to achieve regulatory compliance with Federal Communications Commission Part 68, which governs electrical connections to the telephone network in order to prevent network harm, an isolation barrier capable of withstanding 1000 volts rms at 60 Hz with no more than 10 milliamps current flow, must exist between circuitry directly connected to the two wire telephone network and circuitry directly connected to the residential wall outlet.

There exists a need for reliable, accurate and inexpensive DAA circuitry for effecting the DC termination characteristics for multiple phone line standards and a DAA circuitry which also provides the necessary electrical isolation barrier.

SUMMARY OF THE INVENTION

The above-referenced problems are addressed by the present invention, which provides a reliable, inexpensive, DAA circuit that may be utilized with multiple telephone interface standards and which also provides an isolation system that is substantially immune to noise that affects the timing and/or amplitude of the signal that is transmitted across the isolating element, thus permitting an input signal to be accurately reproduced at the output of the isolation system.

The present invention provides digital direct access arrangement (DAA) circuitry that may be used to terminate the telephone connections at the user's end to provide a communication path for signals to and from the phone lines. Briefly described, the invention provides a means for providing DC termination for a variety of international phone standards. The invention may also be utilized with means for transmitting and receiving a signal across a capacitive isolation barrier. More particularly, a DC holding circuit is provided that is a second order circuit. The use of a second order circuit provides improved distortion characteristics, particularly at low frequencies.

In one embodiment, a communication system is provided. The system may comprise phone line side circuitry that may be coupled to phone lines and powered side circuitry that may be coupled to the phone line side circuitry through an isolation barrier. The system may further include a DC holding circuit within the phone line side circuitry, the DC holding circuit having at least two frequency poles.

In another embodiment, a method of providing a communication system that may be coupled to a phone line is provided. The method may include coupling an isolation barrier between powered circuitry and phone line side circuitry, and forming a DC holding circuit within the phone line side circuitry, the DC holding circuit comprising a second order circuit.

In yet another embodiment, a DC holding circuit for a communication system that may be connected to phone lines is provided. The DC holding circuit may comprise an integrated circuit, external circuitry external to the integrated circuit, and internal circuitry within the integrated circuit, the external circuitry and the internal circuitry being coupled together. The circuit may further include at least a first capacitor within the external circuitry and at least a second capacitor within the external circuitry, the first and second capacitors providing at least a second order DC holding circuit.

In an alternative embodiment, a DC holding circuit is provided. The circuit may comprise at least one input, the input receiving phone line DC loop current, a first frequency pole generating circuit within the DC holding circuit coupled to the at least one input, and a second frequency pole generating circuit within the DC holding circuit, wherein the DC holding circuit is at least a second order circuit.

In still another embodiment, a method of operating a DC holding circuit is provided. The method may include providing a DC holding circuit, generating a first frequency pole within the DC holding circuit, and generating a second frequency pole within the DC holding circuit such that the DC holding circuit is at least a second order circuit.

DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF THE PREFERRED EMBODIMENTS

Figure 1:
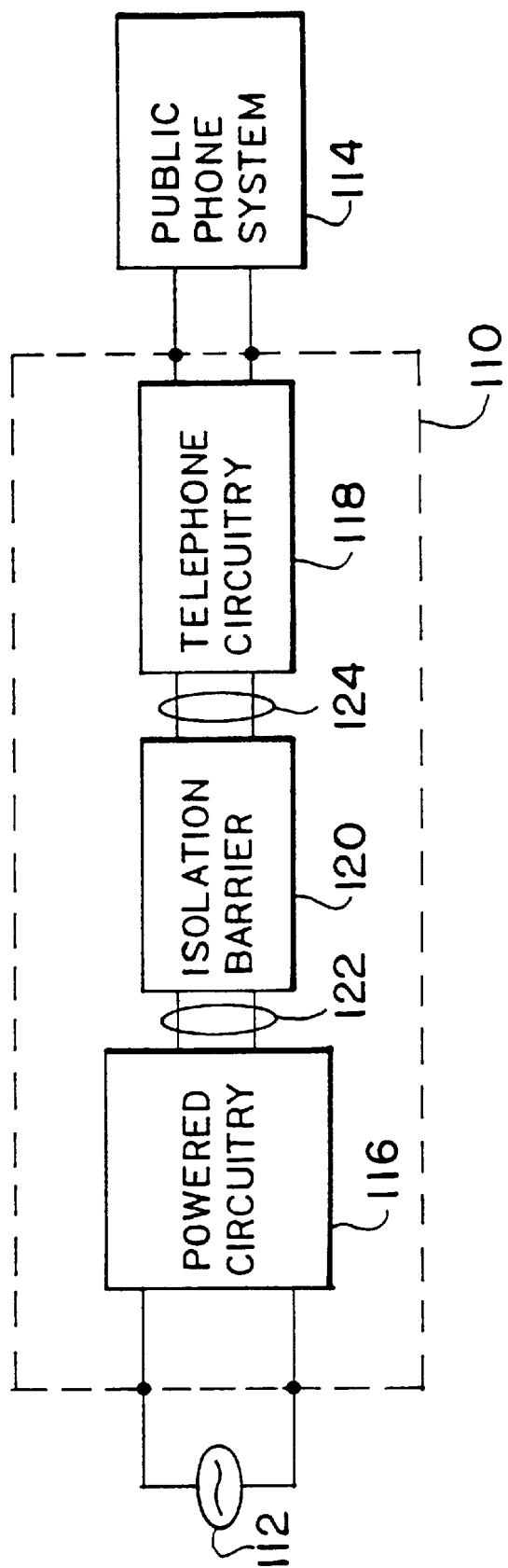
FIG. 1 is a block diagram of a telephone set illustrating a typical application of the present invention.

In order to provide a context for understanding this description, FIG. 1 illustrates a typical application for the present invention: a telephone that includes circuitry powered by a source external to the phone system. A basic telephone circuit 118 is powered by the "battery" voltage that is provided by the public telephone system and does not have a separate power connection. Many modem phones 110, however, include radio (cordless), speakerphone, or answering machine features that require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 that is connected to the phone lines, to prevent dangerous or destructive voltage or current levels from entering the phone system. (Similar considerations exist in many other applications as well, including communication, medical and instrumentation applications in which this invention may be beneficially applied.) The required isolation is provided by isolation barrier 120. The signal that passes through the isolation barrier 120 is an analog voice signal in a typical telephone application, but it may also be a digital signal or a multiplexed signal with both analog and digital components in various applications. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
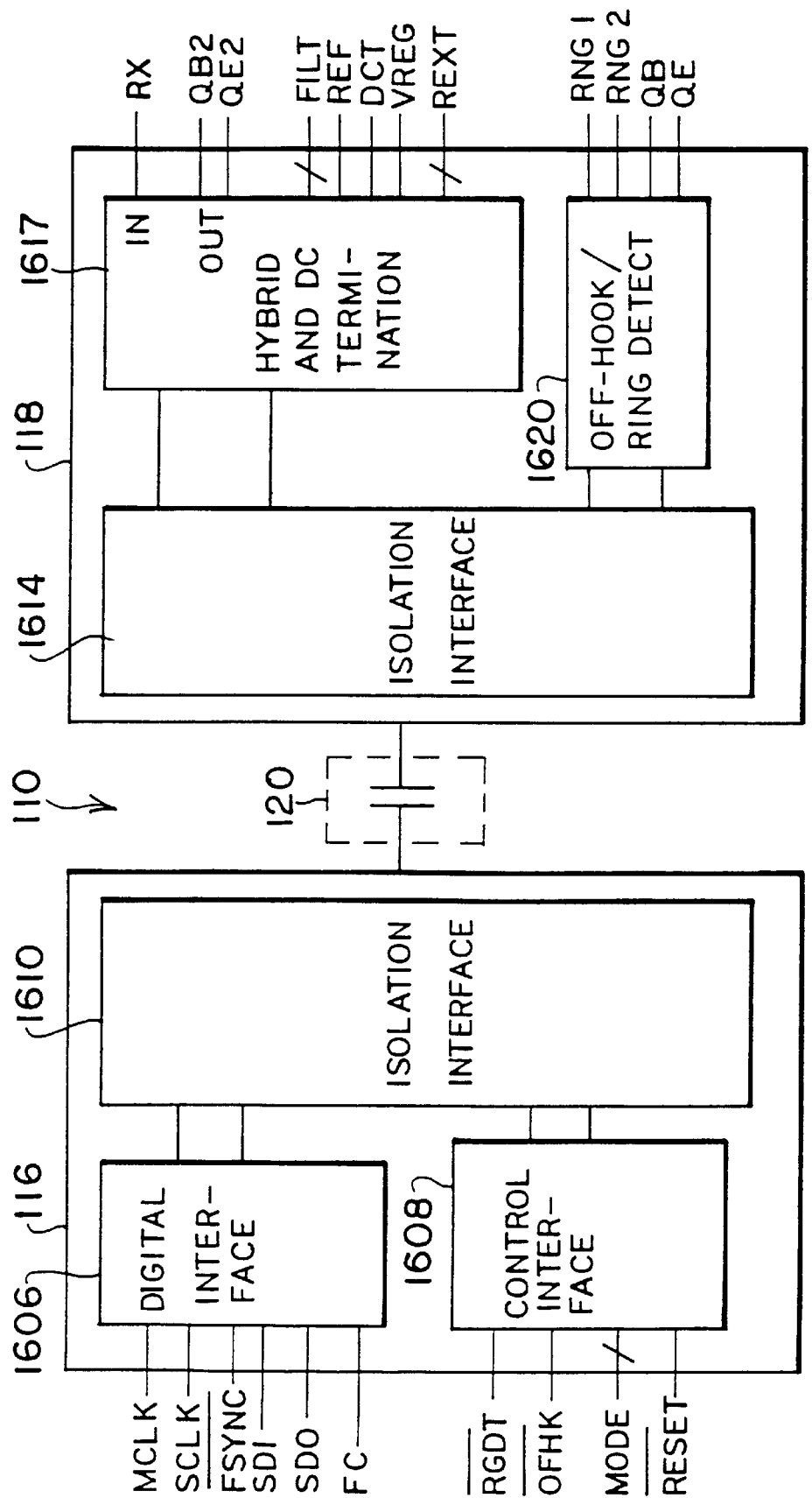
FIG. 2 is a general block diagram of digital DAA circuitry including phone line side circuitry, an isolation barrier, and powered side circuitry according to the present invention.

FIG. 2 is a general block diagram of digital DAA circuitry 110 including phone line side circuitry 118, an isolation barrier 120, and powered side circuitry 116 according to the present invention. The isolation barrier 120 may include one or more capacitors and allow for the transmission of digital information between the isolation interface 1614 in the phone line side circuitry and the isolation interface 1610 in the powered side circuitry. The phone line side circuitry 118 may be connected to phone lines of a telephone network system, and the powered side circuitry 116 may be connected to external controllers, such as digital signal processors (DSP), that may be part of a communication device, such as a phone or modem.

The powered side circuitry 116, which may be implemented as an integrated circuit (IC), may communicate with the external controller through a digital interface 1606 and a control interface 1608. For example, the digital interface 1606 may have a number of external pins providing a serial port interface to the external controller, such as a master clock input pin (MCLK), a serial port bit clock output (SCLK), a serial port data IN pin (SDI), a serial port data OUT pin (SDO), a frame sync output pin (FSYNC_bar) (it is noted that the suffix "_bar" is used to denote a signal that is typically asserted when at a low logic level), and a secondary transfer request input pin (FC). Similarly, the control interface 1608 may have a number of external pins providing control and status information to and from the external controller, such as a ring detect status pin (RGDT_bar), an off-hook status pin (OFHK_bar), a reset pin (RESET_bar), and multiple mode select pins (MODE). In addition, the digital interface 1606 and the control interface 1608 are connected to the isolation interface 1610 so that control, status, signal and other desired information may be transmitted to and received from the phone line side circuitry 118 across the isolation barrier 120.

The phone line side circuitry 118, which may be implemented as an integrated circuit (IC), may communicate with the phone lines through hybrid and DC termination circuitry 1617 (the DC termination circuitry provides an internal power supply voltage), and determine ring-detect and off-hook status information through off-hook/ring-detect block 1620. In addition, the hybrid and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of the hybrid and DC termination circuitry 1617 has an output pin QE2 (pin QE2 is also utilized for DC termination functions as described below) and an input pin (RX) that may connect to external telephone interface circuitry such as hook-switch circuitry and a diode bridge. The hybrid circuitry may function to split the differential signal existing on the phone, which typically includes both transmit and receive analog information, into an internal transmit signal ($TX_{INT}$) and receive signal ($RX_{INT}$) It is noted that the QE2 output pin is used to transmit analog information to the phone lines, and that the RX pin is labeled to indicate that it is used to receive analog information from the phone lines. These external pin signals are different than the internal analog transmit signal ($TX_{INT}$) and analog receive signal ($RX_{INT}$).

Figure 4:
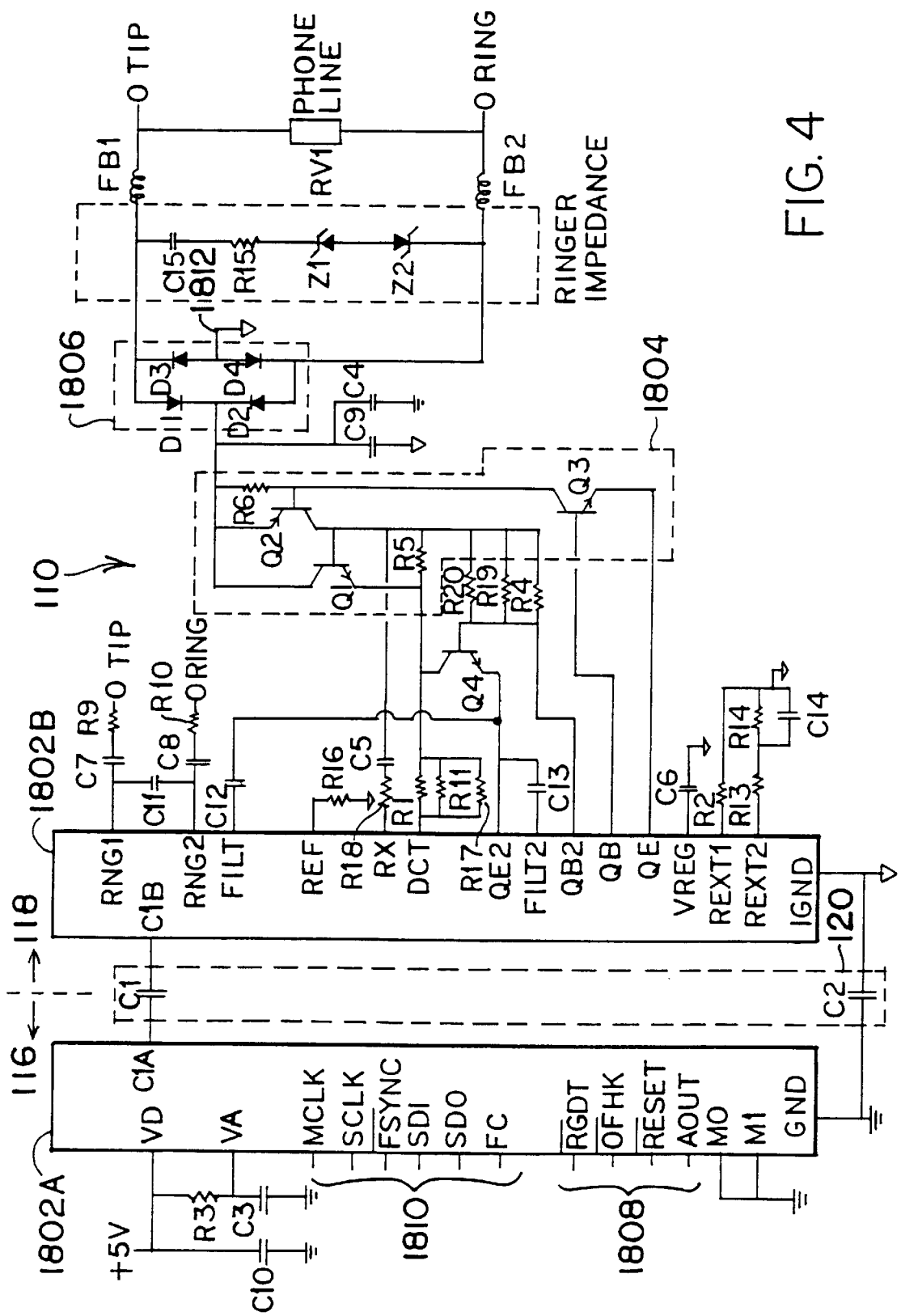
FIG. 4 is a general circuit diagram of digital DAA circuitry implemented with two integrated circuits (ICs), a capacitive isolation barrier, and external circuitry according to the present invention.

The hybrid and DC termination circuitry 1617 may have a number of external pins that also connect to external telephone interface circuitry such as hook-switch circuitry and a diode bridge as shown in FIGS. 2 and 4. For example, the hybrid and DC termination circuitry 1617 may have a DC termination pin (DCT), a voltage regulator pin (VREG), two external resistor pins (REXT and REXT2), two filter pins (FILT and FILT2) and a isolated ground pin (IGND). The DC termination circuitry terminates the DC voltage on the phone line and provides an internal power supply for the phone line side circuitry 118. The DC termination pin (DCT) receives a portion of the phone line DC current with the remainder flowing through pins QE2 and QB2, depending upon the termination mode and DC current level. The voltage regulator pin (VREG) allows external regulator circuitry, such as a capacitor, to be connected to the DC termination circuitry 1617. External resistors and a capacitor may be connected to the two external resistor pins (REXT and REXT2) to set the real and complex AC termination impedance respectively. The filter pin FILT (along with the capacitor C5) sets the time constant for the DC termination circuit. The filter pin FILT2 sets the off hook/on hook transient responses for pulse dialing. The isolated ground pin (IGND) may be connected to the system ground for the powered side circuitry 116 through a capacitor within the isolation barrier. 120 and may also be connected to the phone line through a ground connection within external diode bridge circuitry.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead of the phone line through a capacitor and resistor, and the second ring detect pin (RNG2) may connect to the ring (R) lead of the phone line through a capacitor and resistor. In addition, off-hook/ring-detect block 1620 may have external output pins (QB, QE) that control external off-hook circuitry to enter, for example, an off-hook state or a limited power mode to get caller identification information. More particularly, the output pins (QB, QE) may be connected to the base and emitter, respectively, of a bipolar transistor within external hook-switch circuitry.

Figure 3:
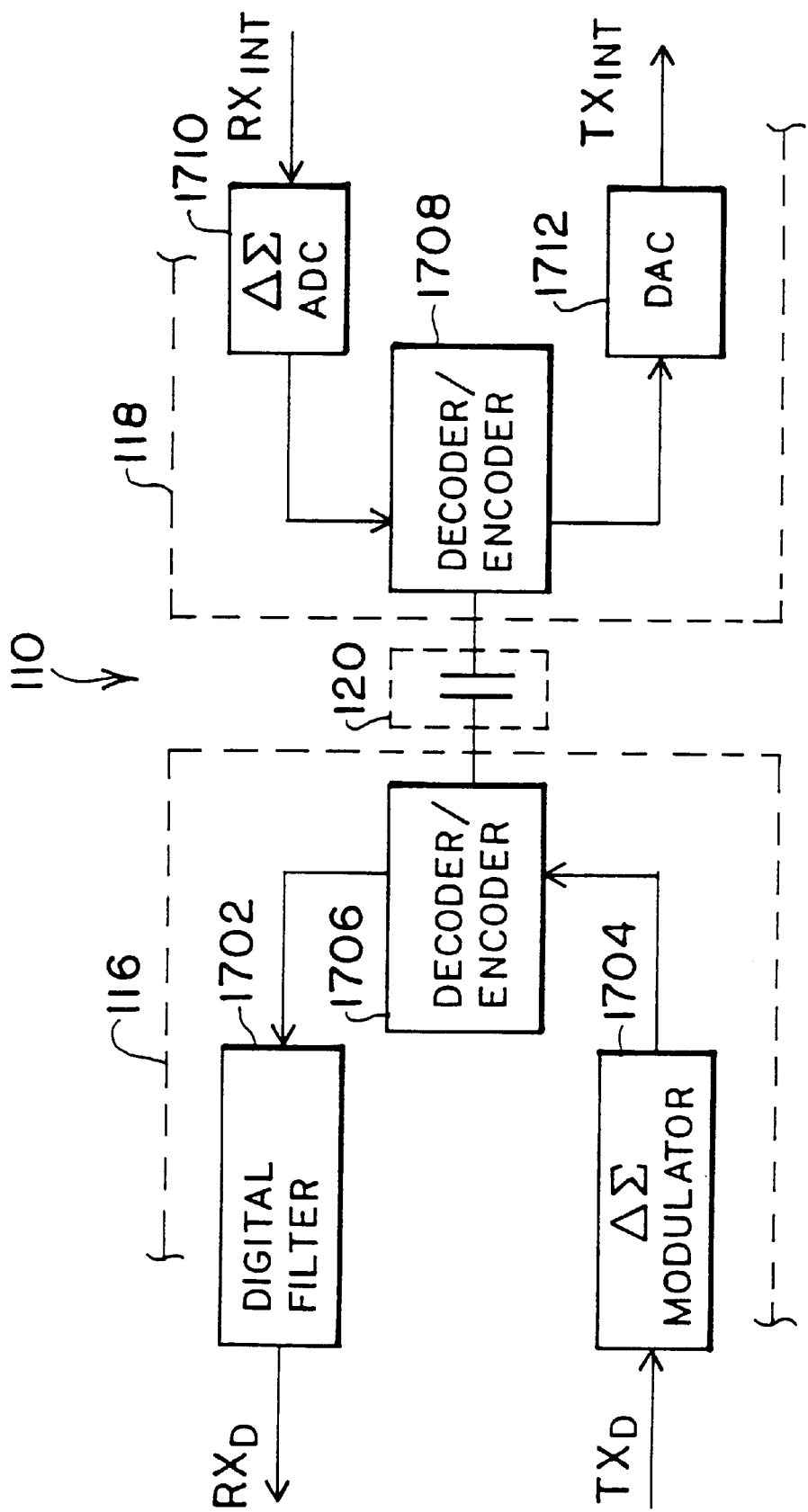
FIG. 3 is a general block diagram of transmit and receive signal paths within digital DAA circuitry according to the present invention.

FIG. 3 is a general block diagram of internal transmit (TX) and receive (RX) signal paths within digital DAA circuitry 110 according to the present invention. In the embodiment depicted, information may communicated in either direction across the isolation barrier 120. It is noted that FIG. 3 does not depict all of the functional blocks within powered side circuitry 116 and phone line side circuitry 118. It is also noted that the blocks depicted may be implemented as numerous additional blocks carrying out similar functions.

In the embodiment of FIG. 3, communications from the phone line side circuitry 118 to the powered circuitry 116 are considered receive signals. Within phone line side circuitry 118, a delta-sigma analog-to-digital: converter (ADC) 1710 receives an internal analog receive signal ($RX_{INT}$), which may be provided for example by hybrid circuitry 1617. The output of delta-sigma ADC 1710 is oversampled digital data stream in a pulse density modulation format. The decoder/encoder circuitry 1708 processes and formats this digital information as desired before sending it across the isolation barrier 120 as encoded digital information. For example, decoder/encoder 1708 may multiplex control data with the digital stream before it is sent across the isolation barrier 120. This control data may be any desired information, such as ring detect signals, off-hook detect signals, other phone line status information or data indicative of the country in which the DAA will be utilized (so that the appropriate phone line interface standards will be satisfied). Within powered side circuitry 116, the decoder/encoder 1706 decodes this encoded digital information received across the isolation barrier 120. The digital filter 1702 processes this decoded digital stream and converts it into internal digital receive data ($RX_D$) that may be provided through the digital interface 1606 to an external controller.

Communications from the powered side circuitry 116 to the phone line side circuitry 118 are considered transmit signals. Within powered side circuitry 116, a delta-sigma modulator 1704 receives an internal digital transmit signal ($TX_D$), which may be provided for example from an external controller through digital interface 1606. The output of delta-sigma modulator 1704 is an oversampled digital data stream in a pulse density modulation format. The decoder/encoder circuitry 1706 processes and formats this digital information as desired before sending it across the isolation barrier 120 as encoded digital information. For example, decoder/encoder 1706 may multiplex control data with the digital stream. This control data may be any desired information, such as ring detect signals, off-hook detect signals, or other phone line status information. In addition, decoder/encoder 1706 may add framing information for synchronization purposes to the digital stream before it is sent across the isolation barrier 120. Still further, decoder/encoder 1706 may format the digital data stream so that a clock signal may be recovered within the phone line side circuitry 118. Within phone line side circuitry 118, the decoder/encoder 1708 may recover a clock signal and may decode the encoded digital information received across the isolation barrier 120 to obtain framing, control or status information. The digital-to-analog converter (DAC) 1712 converts the decoded digital stream and converts it into internal analog transmit data ($TX_{INT}$) that may be provided as an analog signal through the hybrid circuitry 1617 and ultimately to the phone lines.

FIG. 4 is a general circuit diagram of digital DAA circuitry 110 implemented with a two integrated circuits (ICs) and a capacitive isolation barrier 120 according to the present invention. In particular, powered side circuitry 116 may include a powered side integrated circuit (IC) 1802A, and phone line side circuitry 118 may include a phone line side IC 1802B. External circuitry, such as hook-switch circuitry 1804 and diode bridge circuitry 1806, is also shown connected to external pins of the phone line side IC 1802B. In the embodiment depicted, external pins 1810 of the powered side IC 1802A are connected to an external digital signal processor (DSP) and the external pins 1808 are connected to a external application specific IC (ASIC) or controller. The isolation barrier 120 may include a first capacitor (C1) connecting an external signal (C1A) pin on the powered side IC 1802A to an external signal (C1B) pin on the phone line side IC 1802B. In addition, the isolation barrier 120 may have a second capacitor (C2) connecting the isolated ground (IGND) pin on the phone line side IC 1802B to the system ground (GND) pin on the powered side IC 1802A. In addition, the isolated ground (IGND) pin may be connected to node 1812 within diode circuitry 1806 (and thereby be connected to the phone line) and the remaining ground connections of the external circuitry of the phone line side circuitry 118. Typical component values for the various external capacitors, resistors, transistors, and diodes for the circuit of FIG. 4 are shown in Table 1.

TABLE 1

External Component Values

| Symbol | Value |
| --- | --- |
| C1 | 150 pF, 4 kV, X7R, ±20% |
| C2, C4 | 1000 pF, 4 kV, X7R ±20% |
| C3, C6, C10, C13 | 0.1 μF, 16 V, ±20% |
| C5 | 0.1 μF, 50 V, X7R, ±20% |
| C7, C8 | 680 pF, 300 V, X7R, ±5% |
| C9 | 22 nF, 300 V, X7R, ±20% |
| C11 | 2200 pF, 50 V, X7R, ±5% |
| C12 | 0.22 μF, 16 V, ±20% |
| C14 | 560 nF, 16 V, X7R, ±20% |
| C15 | 0.47 μF, 300 V, ±20% |
| R1, R4, R11, R17, R19, R20 | 4.87 KΩ, ¼ W ±1% |
| R2 | 400 Ω, ¹⁄₁₀ W ±5% |
| R3 | 10 Ω, ¹⁄₁₀ W, ±5% |
| R4 | 2.2 kΩ, ½ W, ±5% |
| R5, R6 | 30 kΩ, ¹⁄₁₀ W ±5% |
| R9, R10 | 30 kΩ, ¼ W ±5% |
| R13 | 140 Ω, ¹⁄₁₀ W ±5% |
| R14 | 445 Ω, ¹⁄₁₀ W ±5% |
| R15 | 18.7 kΩ, ¼ W ±5% |
| R16 | 10 kΩ, ¼ W ±5% |
| R18 | 2.2 KΩ, ¹⁄₁₀ W ±5% |
| Q1 | Zetex FMMT 497 |
| Q2 | Motorola MMBTA92LT1 |
| Q3 | Motorola MMBTA42LT1 |
| Q4 | Motorola PZT2222AT1 |
| FB1, FB2 | Ferrite Bead |
| RV1 | Sidactor 270 V |
| D1–D4 | 1N4004 |
| Z1, Z2 | Zener Diode 6 V |

A variety of characteristics of the DAA may be programmable in order to achieve compliance with a variety of regulatory standards. Thus, the DC termination characteristics, AC termination characteristics, ringer impedance, or billing tone detector of the DAA circuitry 110 may be programmable in order to achieve compliance with a variety of regulatory standards. For example, the DC current limiting requirements of French and TBR21 standards may be programmable obtained. Further, the low voltage requirements of Japan, Italy, Norway, and other countries may also be programmable obtained. More particularly, four DC termination modes (modes 0, 1, 2, and 3) may be programmed by setting two bits of a programmable register through use of the serial port data IN pin (SDI). More particularly, mode 2 is the standard loop voltage mode having no current limiting and with the transmit signal limited to −1 dBm. This mode is utilized to satisfy FCC and many European country requirements. FIG. 5C illustrates the I–V characteristics of mode 2. As shown in FIGS. 5A–5D, the DC voltage across the TIP and Ring lines is plotted as a function of the DC loop current from the phone line. Within the operating range of 15 mA to 100 mA, the DC impedance of the DC holding circuit is approximately 50Ω (the slope of the I–V curve). The low voltage standards required for some countries (for example Norway) will be met by the low voltage mode 0 shown in FIG. 5A with the transmit signal limited to −5.22 dBm. The slightly higher (approximately 0.3V higher) low voltage requirements of other countries (for example Japan and Italy) may be met by the low voltage mode 1 shown in FIG. 5B with the transmit level limited to −2.71 dBm. As with mode 2, both low voltage modes 0 and 1 operate with a DC impedance of the DC holding circuit at approximately 50Ω. FIG. 5D illustrates the I–V characteristics of mode 3 which is a current limiting mode as required in France and under the TBR21 standard. As shown in FIG. 5D, a first segment A of the I–V curve operates at a 50Ω impedance and a second segment B of the I–V curve operates at a 3200Ω impedance so that the DC termination will current limit before reaching 60 mA (i.e. less than 60 mA at approximately 35 volts or less. The crossover point between the two portions A and B of the curve is indicated as point C. A third segment D of the I–V curve of FIG. 5D operates at an 800Ω impedance.

The data for the particular country the DAA will be utilized within (and thus the required telephone line interface standards) may be transmitted across the capacitive barrier 120 with the various other DAA control signals. The phone line side circuitry 118 can then be programmably configured to satisfy the different various international DC termination requirements. Thus, a digitally programmable system is provided in which control bits can be provided across the isolation barrier to program the phone line side circuitry 118 in a manner such that a wide variety of phone line interface standards can be satisfied. Moreover, the programmable nature of the phone line side circuitry 118 may minimize the need for changing the external components utilized for coupling the phone line side circuitry 118 to the phone line TIP and RING lines. In this manner a single DAA system may be utilized in a cost effective software programmable manner for world wide use.

Figure 5A:
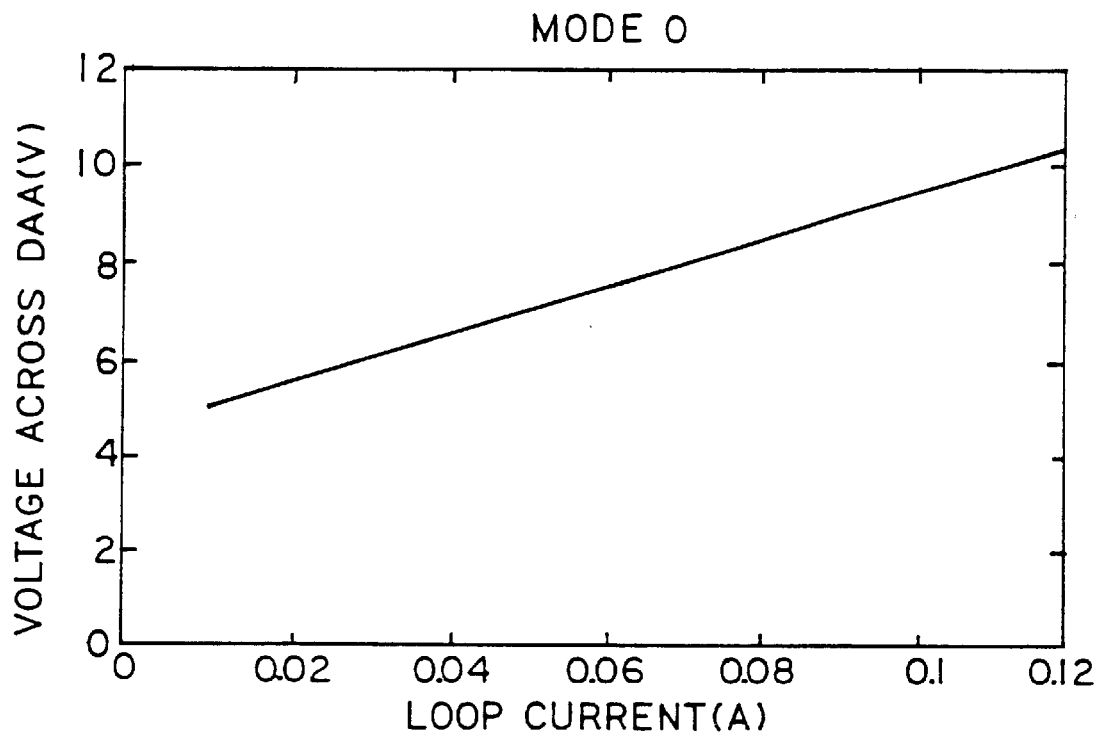
FIGS. 5A–5D are DC termination characteristic curves of various DC termination modes of the present invention.
Figure 5B:
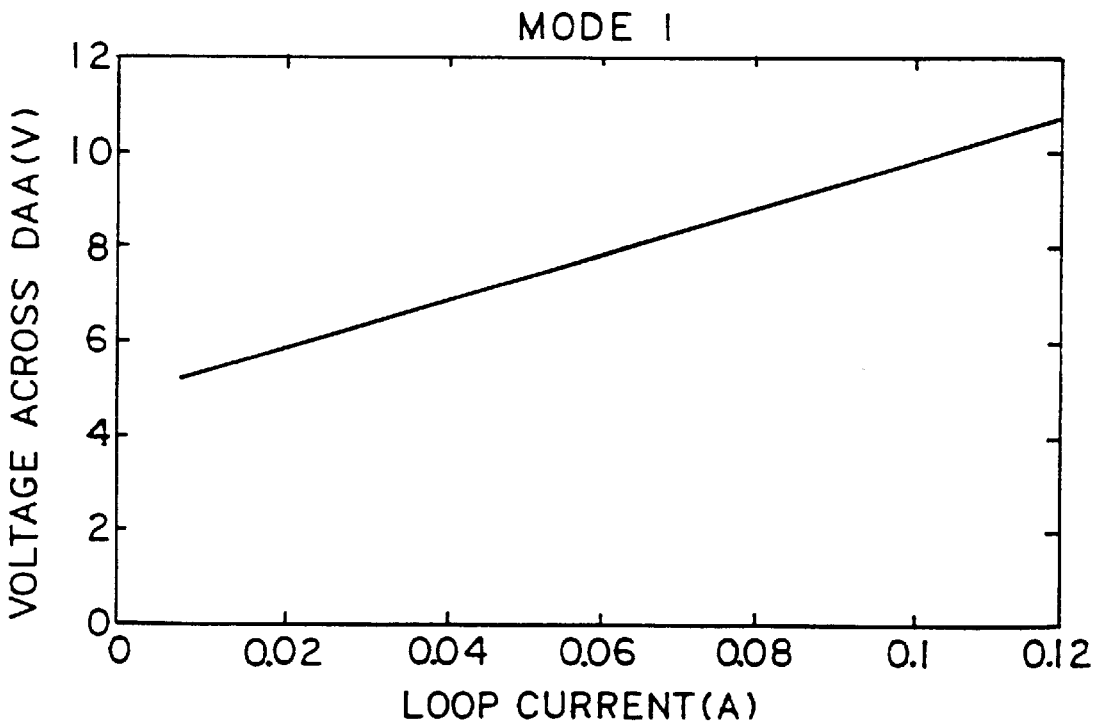
Figure 5C:
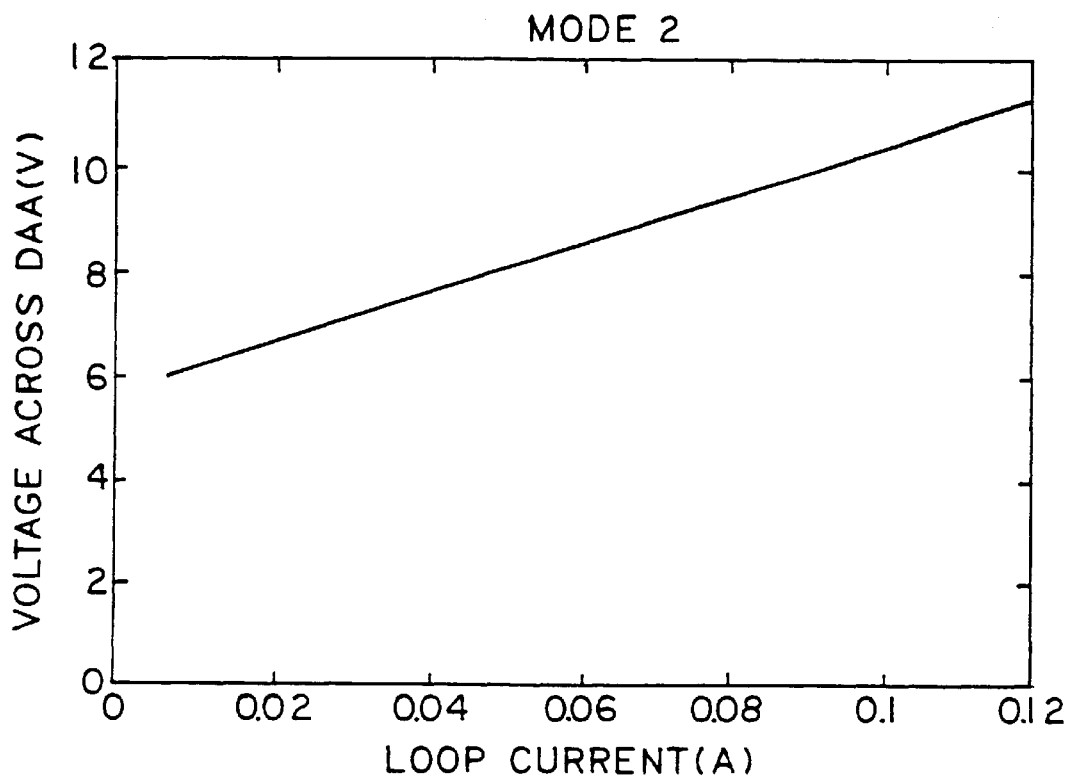
Figure 5D:
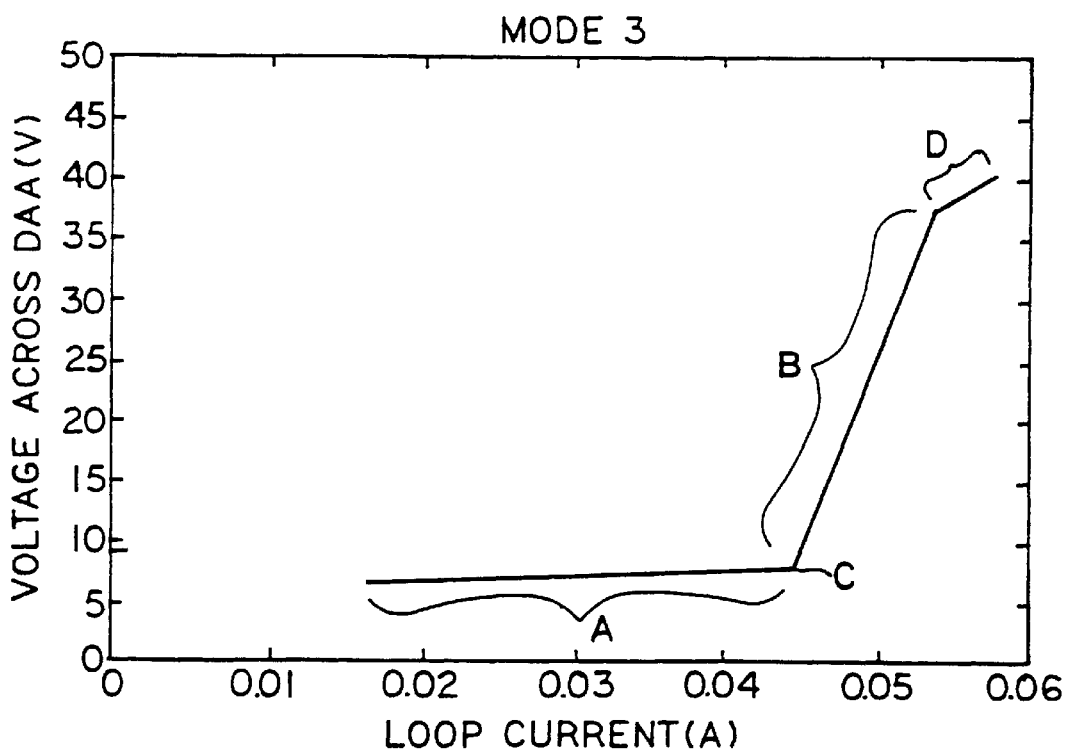
Figure 6:
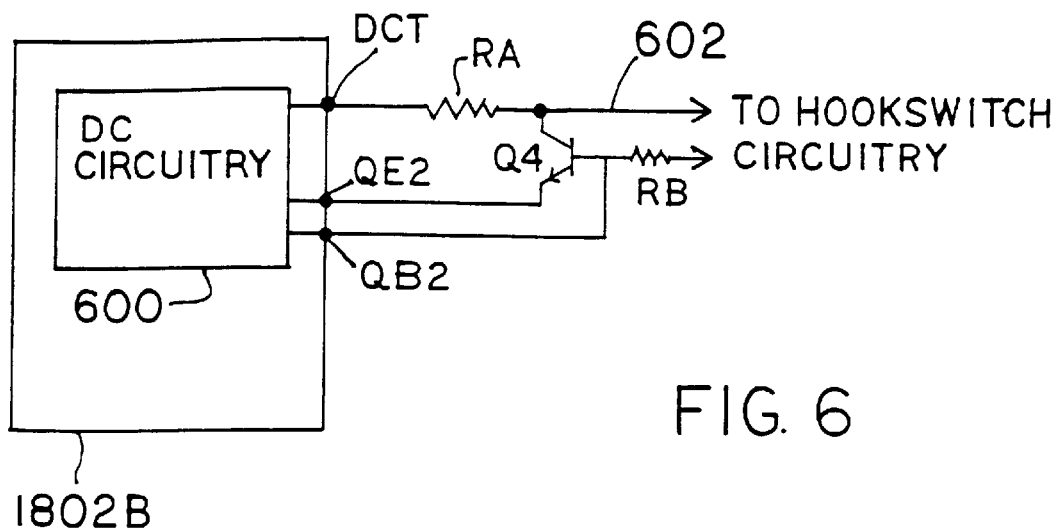
FIG. 6 is a general block diagram of a technique for implementing current limiting according to the present invention.

In order to programmably achieve the DC termination characteristics of FIGS. 5A–5C, the DC termination or DC holding circuit of the present invention provides a variety of improvements over the prior art. For example in order to achieve the current limiting requirements (such as in the TBR21 standard), the phone line side circuitry 118 must dissipate up to approximately two watts of power. Typical non current limiting specifications such as FCC standards will result in only a fraction of that amount of power dissipation to occur. However, it is undesirable to require this increase power dissipation to be performed by the phone line side integrated circuit 1802B. The circuit of FIG. 6 provides a mechanism in which the increased power dissipation requirements of current limiting standards may be achieved by dissipating the additional power external to the integrated circuit. In this manner, a single DAA system may be utilized for both current limiting DC termination standards and non-current limiting standards without requiring excessive power dissipation within an integrated circuit.

As shown in FIG. 6, a phone line side integrated circuit 1802B includes DC termination or DC holding circuitry 600 which is coupled to the DCT, QE2 and QB2 pins. The DCT pin is coupled to a resistor RA, for example a 1600Ω resistor. The QB2 pin is coupled to a resistor RB, for example a 1600Ω resistor. Though shown as single resistors, each resistor RA and RB may be formed from a plurality of resistors such as resistors R1, R11, and R17, and R4, R19, and R20 respectively as shown in FIG. 6. Resistors RA and RB are coupled to the hookswitch circuitry such as shown in FIG. 4. The QE2 and QB2 pins are coupled to the emitter and base of transistor Q4 respectively. In operation, the DC current on from the phone line may be directed through resistors RA and RB in varying amounts through control of transistor Q4 in order to adjust the DC impedance seen by the phone lines. For example, the 50Ω impedance section of the I–V curve of FIG. 5D (segment A) may be obtained when the transistor Q4 is fully on and the bulk of the DC current passes through transistor Q4. The 3200Ω impedance section of the I–V curve of FIG. 5D (segment B) may be obtained while the transistor Q4 is being turned off and thus actively steering current through resistors RA and RB. The 800Ω impedance section of the I–V curve of FIG. 5D (segment D) may be obtained when the transistor Q4 is fully turned off and thus the DC current is split between the resistors RA and RB.

The DC termination mode may be selectably programmed through the powered side circuitry 116 and control information transmitted across the capacitive barrier 120 to the DC holding circuitry 600. More particularly, the DC holding circuitry controls transistor Q4 depending upon the selected mode. Thus when current limiting is desired, additional current may be steered to the resistors RA and RB. In this manner the higher impedance needed for current limiting specifications such as the 3200Ω impedance section of the I–V curve of FIG. 5D may be accurately achieved. Further, the additional power dissipation is performed external to the phone line side integrated circuit 1802B by resistor RA, resistor RB, and transistor Q4. Thus in one exemplary, resistor RA and resistor RB may each dissipate up to approximately three-fourths of a Watt, transistor Q4 up to one-half Watt while the integrated circuit need only dissipate up to three-tenths of a Watt. This technique is particularly advantageous in that much of the power is dissipated in passive elements (resistors) rather than solely in active devices. Thus, more than 50% of the DC power dissipated by the DC holding circuit may be dissipated in devices external to the integrated circuit 1802B, and more particularly, more than 50% of the DC power may be dissipated in passive resistor devices.

Figure 7:
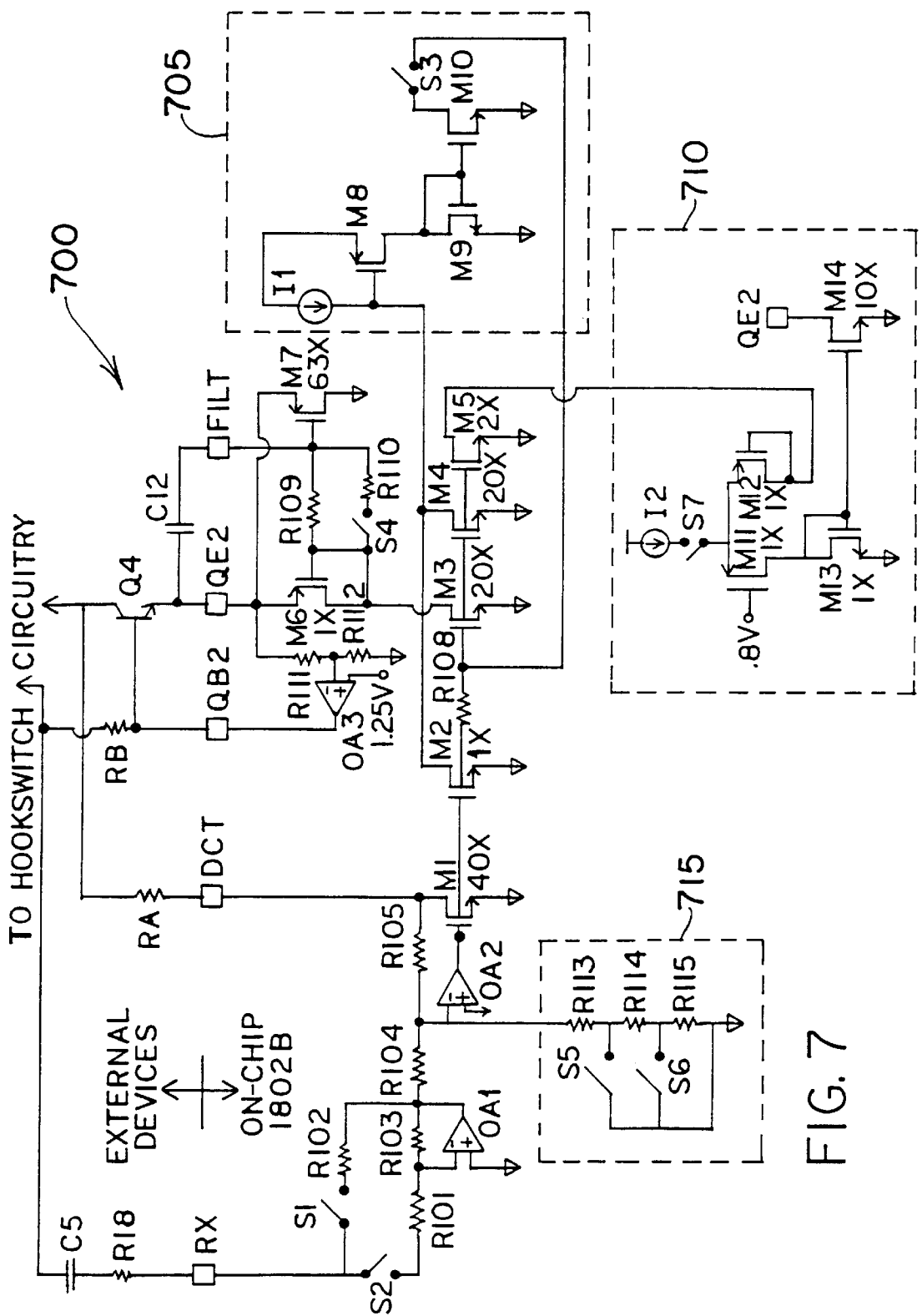
FIG. 7 is a circuit diagram of a DC holding circuit according to the present invention.

A DC holding circuit 700 for implementing the DC termination characteristics discussed above is shown in FIG. 7. FIG. 7 illustrates portions of the DAA system with like reference numbers and letters as shown in FIG. 4. As can be seen, FIG. 7 includes circuitry both internal and external to the phone side integrated circuit 1802B. More particularly, FIG. 7 includes the RX, DCT, QB2, QE2, and FILT pins and associated internal and external circuits (the hookswitch circuitry is not being shown). As shown in FIG. 7, the DC holding circuit 700 includes switches S1, S2, S3, S4, S5, S6, and S7. As discussed in detail below, the switches may be utilized to select the current limiting or non-current limiting modes of operation, to switchably operate the DC holding circuit in order to achieve fast settling times and low frequency operation and to select the low voltage modes of operation.

The DC holding circuit 700 also includes a current limiting circuit block 705, a distortion adjustment circuit block 710, and a voltage selection circuit block 715. As discussed further below, the current limiting circuit block 705 operates in conjunction with proper selection of switches to implement the higher effective impedance of the DC holding circuit to achieve the desired current limiting effect at a selected current limiting crossover point. The external transistor Q4 is controlled so that in the current limiting mode of operation current may be steered to both resistors RB (which as described above may each be formed from multiple resistors) so that power may be dissipated external to the integrated circuit 1802B. The distortion adjustment circuit block 710 operates to lower the total harmonic distortion at the crossover point. The voltage selection circuit block 715 is utilized to select either of the low voltage modes (modes 0 and 1) or the standard voltage mode (mode 2 or 3) The remaining portions of the DC holding circuit 700 operate in both current limiting and non-current limiting modes as a second order (two pole) system with external capacitors C12 and C5 affecting the frequency of the poles. The components of the DC holding circuit may be configured in a wide variety of manners to obtain the advantages of the invention disclosed herein and the embodiment of FIG. 7 is merely exemplary. 115 Likewise a wide variety of component values may be utilized. In one embodiment, the component values may be selected as shown below in Table 2. The transistors may be sized as labeled "_X" in FIG. 7.

TABLE 2

Internal Component Values

| Symbol | Value |
|---|---|
| R101, R102 | 98 kΩ, |
| R103 | 60 kΩ, |
| R104 | 30 kΩ, |
| R105 | 50 kΩ, |
| R108 | 10 kΩ, |
| R109 | 2 MΩ, |
| R110 | 2 kΩ, |
| R111, R112 | 50 kΩ, |
| R113 | 12.5 kΩ, |
| R114 | 4.16 kΩ, |
| R115 | 2.32 kΩ, |
| I1 | 430 μA |
| I2 | 60 μA |

When the DC holding circuit 700 of FIG. 7 is operating in the non-current limiting mode (modes 0, 1, or 2), switch S3 is open. During the current limiting mode of operation (mode 3) switch S3 is closed. As will be described in more detail below, switches S1, S2, and S4 operate to selectably control time constants of the DC holding circuit 700 for use with PTT specifications which may conflict with very low frequency operations. Switches S5 and S6 are utilized to select the low voltage modes of operation (modes 0 and 1). More particularly, in standard voltage level operation (modes 2 and 3) both switches S5 and S6 are closed. In low voltage mode 0, switches S5 and S6 are both opened. In low voltage mode 1, switch S5 is open and switch S6 is closed. In operation, the selection of the state of the switches S5 and S6 will vary the resistance seen at the negative input of op amp OA2, thus changing the DC voltage at the DCT pin, which in turn changes the voltage between the TIP and RING lines for a given amount of DC loop current. In mode 0 the DC voltage at the DCT pin is 2.8V, in mode 1 3.1V and in modes 2 and 3 4.0V.

Current Limiting

As mentioned above, in the current limiting mode of operation (mode 3) switch S3 is closed and in the non-current limiting modes (modes 0–3) switch S3 is opened. The operation of the current limiting mode is discussed below with the time constant control switches set to a operate in S1 open, S2 closed and S4 open (time constant phase 1) for illustrative purposes. However, the current limiting mode may also be operated with the time constant phase 2 (S1 closed, S2 open and S4 closed) selected.

During non-current limiting modes of operation (transistor Q4 is fully turned), the DC impedance of the DC holding circuit 700 of FIG. 7 is approximately 50Ω when utilizing the illustrative component values of Tables 1 and 2. This impedance value is obtained as explained below. The op amp circuitry of OA1 and OA2 attempt to force the DCT pin to track the AC signal on the TIP and RING lines with the resistor ratios selected in the illustrative embodiment. The op amp circuitry also attempts to prevent the AC current component in the current through transistor M1 (and transistor M3 which is tied to the gate of transistor M1). The resulting DC current through transistor M1, I(M1), will thus be proportional to the DC line voltage since I(M1)=($V_{line}$(DC)−$V_{hookswitch}$(DC)−$V_{diode\ bridge}$(DC)−$V_{DCT}$(DC))/RA, where $V_{hookswitch}$(DC) is the DC drop across the hookswitch circuitry, $V_{diode\ bridge}$(DC) is the DC drop across the diode bridge circuitry and $V_{DCT}$ is the DC voltage at the DCT pin.

Further, the DC current at pin QE2 (and thus transistor Q4), will be a function of the current mirror transistors M6 and M7. More particularly with the 1X : 63X sizing of the current mirror transistors shown in FIG. 7, the DC current at pin QE2, I(QE2), will be approximately 64×I(M3). Since I(M3)=I(M1)/2, I(QE2)=32×I(M1). Further since I(M1)=$V_{line}$/RA+k, I(QE2)=$V_{line}$/(RA/32)+k, wherein k is a constant. Thus, with RA chosen to be 1600Ω the desired DC termination impedance of 50Ω will result in the non-current limiting mode of operation.

When the current limiting mode of operation is entered, the switch S3 will be closed. This will allow current to sink through resistor R108 and transistor M10. Thus, the gate voltage on transistors M1 and M3 will not necessarily be the same. More particularly, when switch S3 is closed the current limiting effect will begin to occur as a function of the value of the DC current source I1 since the current limiting circuit block 705 will attempt to maintain I1≧I(M2)+I(M4). When the loop current is low, and thus the gate voltages on transistors M2 and M4 is at a level such that I1>I(M2)+I(M4), current is not sunk through transistor M10 and the current limiting block 705 does not have an effect. At this point the circuit will be operating in the region of segment A of the mode 3 operation shown in FIG. 5D.

However, as the DC loop current increases, the current through transistors M2 and M4 will increase. When the total current I(M2)+I(M4) reaches the value of I1, the current limiting effect will begin by reducing I(M4) as I(M2) increases by sinking current through resistor R108 and transistor M10. In this manner the relationship I1=I(M2)+I(M4) may be maintained. This has the effect of reducing the current through transistor M3 and thus actively steering current out of the QE2 pin and into resistors RA and RB. At this point the circuit will be operating in the region of segment B of the mode 3 operation shown in FIG. 5D. The location of the crossover point C (the point of change of DC impedance) of FIG. 5D is thus dependent upon the value of I1. In the illustrative embodiment shown, I1 may be 430 μA to achieve a current limiting crossover point at approximately 45 mA of DC loop current.

Distortion Limiting At Current Crossover

Figure 8:
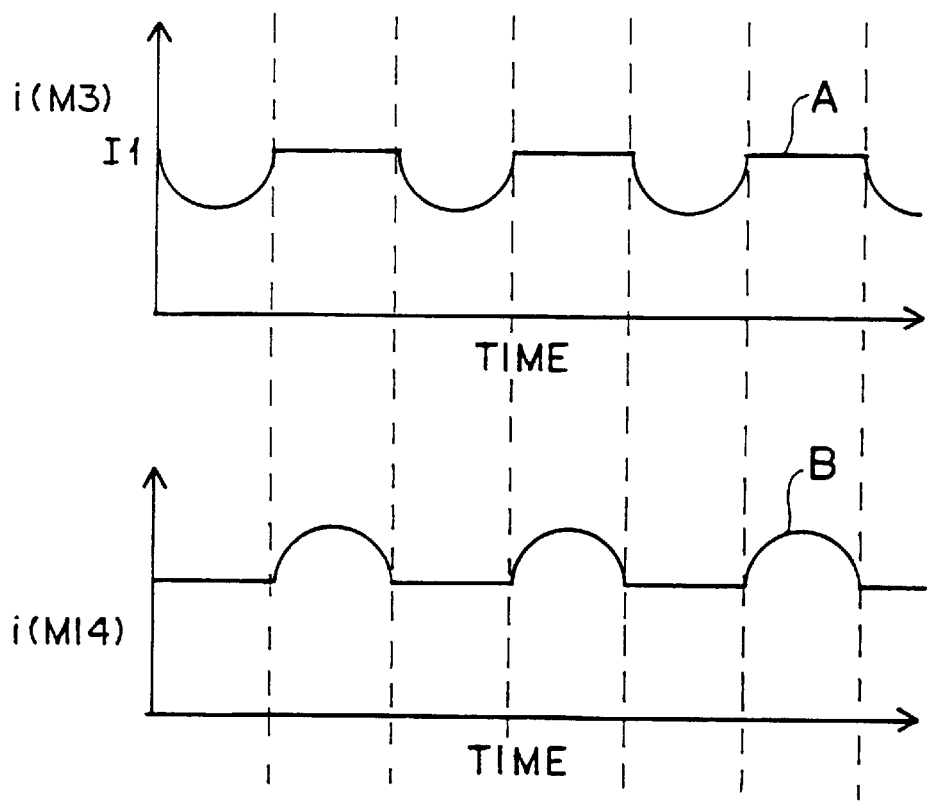
FIG. 8 is graph of current characteristics of a distortion limiting technique according to the present invention.

The current limiting technique discussed above has potential to increase the harmonic distortion at the crossover (or "knee") point of the DC I–V curve of FIG. 5D. More particularly, though ideally the current through transistor M3 has no AC component, in practice non-ideal circuit components, mismatches, etc. will result in some AC component of the current through M3. Thus, the total phone line current, $i_{LINE}$, will include the DC loop current of the holding circuit, the AC phone signal, and AC component of the current in M3. Distortion in the AC component of the current in M3 will therefore add harmonic distortion to the phone line signal. The current limiting techniques discussed above will add distortion to the AC component of the M3 current when the DC loop current is located at the crossover point or close to it. More particularly, in such situations the AC component of the transistor M3 current will have result of repeatedly turning on and off the current limiting effect. This will result in the AC component of the current in transistor M3 to also be repeatedly limited or not limited, thus distorting the AC component. For example, when the DC loop current is located at the crossover point and a low frequency sine wave is applied on the phone line, the AC component of the current through transistor M3 may be clipped as shown by curve A of FIG. 8. As shown in FIG. 8, the clipping of curve A will occur when the total current through M3 exceeds the value of the current limit level, I1.

This distortion will be most significant for relatively low frequency signals (about less than 100 Hz) due to the low pass filtering effect of capacitor C5 on the output of OA2 which tends to remove higher frequency components (note that C5 provides a high pass filter to node RX which in turn performs a low pass filtering effect on the gate of transistor M1 through the use of OA1 and OA2).

The distortion adjustment circuit block 710 of FIG. 7 compensates for this clipping effect through control of transistor M14 which is also coupled to the QE2 pin. The distortion adjustment circuit block 710 operates in the mode 3 current limiting mode through the closure of switch S7. In other modes, switch S7 is opened and the distortion adjustment circuit block 710 does not affect the DC holding circuitry. The distortion adjustment circuit block 710 operates such that the current through transistor M14 has a response opposite to that of the current through transistor M3 such as shown by curve B of FIG. 8. Because both transistors M3 and M14 are coupled to the QE2 pin, the total AC component effect of the current through transistors M3 and M14 will sum together. Since curves A and B FIG. 8 demonstrate opposite clipping effects, the summation of these currents will be relatively free of clipping and the associated distortion, at least to a first order. The current response of curve B is obtained through the current steering relationship of transistors M3, M12, M11 and M14. Thus, with the transistor sizing shown in FIG. 7, the relationship i(M14)=(10×I2)−i(M3) will result and the resulting AC component seen by the phone line due to the AC component of the current in transistors M3 and M4 will be 10×I2. The value of I2 may be chosen such that I2 is greater than I(M3)/10 at the crossover point.

$2^{nd}$ Order DC Holding Circuit

The DC holding circuit 700 of FIG. 7 is further advantageous in that it is a second order DC holding circuit. More particularly, a first and second pole in the frequency response of the circuit is provided through the use of capacitors C5 and C12 respectively. The first pole results from the filtering action at the RX pin resulting from capacitor C5 and the associated resistors coupled to the RX pin. This filtering action is relatively sufficient at high frequencies (for example 100 Hz or greater) to result in very little AC signals on the common gate line of transistors M1 and M3 (and thus low AC current components through those transistors). However, at low frequencies more AC current components will be present in transistors M1 and M3 which would result in distortion at low frequencies. Improved frequency response may be obtained by adding a second frequency pole to the system. For example, another stage of low pass filtering could be added between the gates of transistor M1 and M3 to more heavily filter the gate signal on transistor M3. Alternatively, as shown in FIG. 7 the additional low pass filtering may be provided through the use capacitor C12 coupled to the QE2 pin. The use of the filter capacitor C12 coupled to the QE2 pin also provides noise filtering of the large PMOS device M7 which is used as a large current sinking device.

Thus, a second order DC holding circuit is provided. The use of a second order frequency response circuit provides a DC holding circuit which may have greater than 60 dB THD at 100 Hz, 20 mA, −1 dBm. The second order DC holding circuit is shown in one implementation to have two filter capacitors (C5 and C12) placed external to the phone side integrated circuit 1802B, however, other circuit techniques may be utilized to achieve a second order DC holding circuit. It is desirable that the frequency poles by low frequency poles, such as at or below 300 Hz, and more particularly below 50 Hz. In the illustrative implementation, the first filter resulting from capacitor C5 provides a first pole at 16 Hz (a low pass filter effect on the gate of transistor M1). The second filter resulting from capacitor C12 provides a second pole at 0.44 Hz.

Switchable Time Constants

It is generally desirable that the DC holding circuit present a impedance at DC and at AC frequencies the DC circuitry is removed from the signal path. One way to achieve such performance would be to provide a DC circuit which operates very slowly such that it is cut off at frequencies above several hertz. This may be particularly important when transmitting very low frequency modem signals (down to approximately 10 hertz) which have low distortion requirements such as greater than 75 dB THD for frequencies greater than 300 Hz (full scale), 60 dB THD for frequencies greater than 100 Hz (full scale), and), and 80 dB THD for frequencies greater than 100 Hz (at −9 dBm) However, the use of very slow DC holding circuitry would conflict with phone line interface standards in many PTT specifications. For example, some interface standards which require rapid on-hook and off-hook switching. For example, the settling time for switching between on-hook and off-hook conditions may be required to be greater than 90% loop current settling in 20 msec from an off hook event. Such time constraints may be particularly important for pulse dialing.

The present invention may include the use of switchable time constants which affect the speed of the DC holding circuitry. Thus, the DC holding circuitry may be operated in a first phase (phase 1) which has a fast settling time and in a second phase (phase 2) which has slow settling time to allow low frequency operation. Thus, the DC holding circuit may be utilized to meet the standards for rapid on/off-hook operation (such as in pulse dialing) and then after the phone line goes off-hook the DC holding circuit may be switched to slower circuit operation to allow low frequency phone line signal operation. In this manner a DC holding circuit having a variable operating frequency is provided.

The phase of operation, high speed phase 1 or low speed phase 2, is controlled by switches S1, S2, and S4. During high speed phase 1, switch S1 is closed, S2 opened and S4 closed. Closing switch S1 and opening switch S2 results in removing the first frequency pole (caused by capacitor C5) from the DC holding circuit. Further, closing switch 4 increasing the second frequency pole to 360 Hz since the time constant of the loop current settling is now set by capacitor C12 and resistor 110 in parallel with resistor R109. The value of the capacitor and resistors may be selected (as shown above) to provide proper settling within a few milliseconds to give fast pulse dialing settling. It is noted that during phase 1, capacitors C5 and C12 will charge to their appropriate values. This charging will help minimize transient glitches when switching from phase 1 to phase 2. When the DC holding circuit is switched to phase 2, the standard second order DC holding circuit operation described above results. Phase 2 may be set to activate at approximately 200 msec after off-hook conditions occur. The switching between phase 1 and phase 2 conditions may be utilized with all of the modes of operation (modes 0–3) described above.

Thus, a DAA DC holding circuit operable in two phases is provided. The first phase may be a fast mode of operation used during the transmission of signaling information such as establishment of off-hook conditions or pulse dialing. The second phase may be a slow mode of operation used for the transmission of phone user data (such as, for example, voice data or modem data). The DC holding circuit may be in the first phase until some time period after off-hook conditions are last detected (for example 200 msec). Thereafter the DC holding circuit may be switched to the second phase. The time constant of the circuit for establishing off-hook conditions (the first phase) may be relatively fast or short, typically less than 10 msec, more preferably less than 5 msec and in the illustrative embodiment less than 1 msec. The time constant of the circuit during user data transmission (the second phase) may be relatively slow or long, typically greater than 100 msec, more preferably greater than 200 msec and in the illustrative embodiment approximately 400 msec.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art. For example, though the current steering is shown herein with regard to a programmable DAA, the use of external devices to dissipate substantial amounts of power for DC current limited standards may be utilized in a non-programmable DAA.

We claim:

1. A communication system, comprising:
    phone line side circuitry capable of being coupled to phone lines;
    powered side circuitry capable of being coupled to the phone line side circuitry through an isolation barrier; and
    a DC holding circuit within the phone line side circuitry, the DC holding circuit having at least two frequency poles.

2. The communication system of claim 1, further comprising the isolation barrier coupled between the phone line side circuitry and the powered side circuitry, the isolation barrier being a capacitive barrier.

3. The communication system of claim 1, wherein the phone line side circuitry and the powered side circuitry are configured to communicate across the isolation barrier through digital signals.

4. The communication system of claim 3, further comprising the isolation barrier coupled between the phone line side circuitry and the powered side circuitry, the isolation barrier comprising one or more capacitors.

5. The communication system of claim 1, the DC holding circuit comprising integrated circuitry and external circuitry, the external circuitry comprising at least a first and second capacitor, the first capacitor affecting at least a first frequency pole and the second capacitor affecting at least a second frequency pole.

6. The communication system of claim 1, the two frequency poles are low frequency poles.

7. The communication system of claim 5, the two frequency poles being at frequencies less than about 300 Hz.

8. The communication system of claim 5, the two frequency poles being at frequencies less than about 50 Hz.

9. A method of providing a communication system capable of being coupled to a phone line, comprising:
    coupling an isolation barrier between powered circuitry and phone line side circuitry; and
    forming a DC holding circuit within the phone line side circuitry, the DC holding circuit comprising a second order circuit.

10. The method of claim 9, the DC holding circuit comprising integrated circuitry and external circuitry external to the integrated circuit, the external circuitry including at least two capacitors for affecting at least two frequency poles of the DC holding circuit.

11. The method of claim 10, further comprising utilizing a capacitive barrier to isolate the powered circuitry and the phone line circuitry.

12. The method of claim 10, further comprising passing digital data across the isolation barrier.

13. The method of claim 12, further comprising utilizing a capacitive barrier to isolate the powered circuitry and the phone line circuitry.

14. The method of claim 10, further comprising forming the at least two frequency poles at frequencies less than 300 Hz.

15. The method of claim 14, further comprising forming the at least two frequency poles at frequencies less than 50 Hz.

16. A DC holding circuit for a communication system capable of being connected to phone lines, the DC holding circuit comprising:
    an integrated circuit;
    external circuitry external to the integrated circuit;
    internal circuitry within the integrated circuit, the external circuitry and the internal circuitry being coupled together;
    at least a first capacitor within the external circuitry; and
    at least a second capacitor within the external circuitry, the first and second capacitors providing at least a second order DC holding circuit.

17. The DC holding circuit of claim 16, further comprising at least two low frequency poles.

18. The DC holding circuit of claim 17, the two frequency poles being at frequencies less than about 300 Hz.

19. The DC holding circuit of claim 18, the two frequency poles being at frequencies less than about 50 Hz.

20. The DC holding circuit of claim 16, the DC holding circuit compatible with a phone line interface standard that has a DC current limit requirement, the DC holding circuit further comprising:
    a first impedance level present at one or more inputs of the DC holding circuit for a first set of DC loop current values; and
    a second impedance level present at the one or more inputs of the DC holding circuit for a second set of DC loop current values.

21. A DC holding circuit, comprising:
    at least one input, the input receiving phone line DC loop current;
    a first frequency pole generating circuit within the DC holding circuit coupled to the at least one input; and
    a second frequency pole generating circuit within the DC holding circuit, wherein the DC holding circuit is at least a second order circuit.

22. The DC holding circuit of claim 21, wherein the DC holding circuit has a current limited DC loop current characteristic.

23. The DC holding circuit of claim 22, the first and second frequency poles being low frequency poles.

24. The DC holding circuit of claim 23, the two frequency poles being at frequencies less than about 300 Hz.

25. The DC holding circuit of claim 24, the two frequency poles being at frequencies less than about 50 Hz.

26. A method of operating a DC holding circuit, comprising:

providing a DC holding circuit;

generating a first frequency pole within the DC holding circuit; and generating a second frequency pole within the DC holding circuit such that the DC holding circuit is at least a second order circuit.

27. The method of claim 26, further comprising:

forming the DC holding circuit with internal circuitry internal to an integrated circuit and external circuitry external to the integrated circuit; and providing a first and second filtering capacitor within the external circuitry, at least the first filtering capacitor affecting the first frequency pole and at least the second filtering capacitor affecting the second frequency pole.

28. The method of claim 26, further comprising forming the first and second frequency poles at frequencies less than 300 Hz.

29. The method of claim 28, further comprising forming the first and second frequency poles at frequencies less than 50 Hz.

* * * * *